United States Patent Office
3,817,766
Patented June 18, 1974

3,817,766
HARDENING OF WATERGLASS SOLUTIONS USING PYROCARBONIC ACID ESTERS AND/OR CARBOXYLIC-CARBONIC ACID ESTER ANHYDRIDES
Wulf von Bonin, Leverkusen, Germany, assignor to Bayer Aktiengesellschaft, Leverkusen, Germany
No Drawing. Filed Oct. 18, 1972, Ser. No. 298,727
Claims priority, application Germany, Oct. 27, 1971, P 21 53 532.0; Nov. 19, 1971, P 21 57 371.7
Int. Cl. C04b 35/16
U.S. Cl. 106—75          14 Claims

ABSTRACT OF THE DISCLOSURE

Preferred acidic materials are diethyl pyrocarbonate, benzoic acid-carbonic acid ethyl ester anhydride and (isophthalic acid-carbonic acid ethyl ester) dianhydride. The hardening time can be controlled from a slow set to much shorter periods. Various additives and post-treatments may also be involved.

This invention relates to a process for the manufacture of new types of molded articles which have a purely inorganic silicate skeleton.

Molding resins based on organic compounds which are capable of polymerization or polyaddition reactions have been known for a long time. Inorganic systems which are to some extent comparable with these resins are gypsum, mortar and cements of various compositions. These inorganic systems solidify due to crystallite systems which form when they are mixed with water. Such inorganic systems are, therefore, also solid substances, e.g. powders, which are unworkable until they have been mixed with water. This means that in the liquid form, which is the only form in which they would be comparable with organic molding resins, they have no stability in storage because the water which liquefies them at the same time causes them to solidify.

Aqueous silicate solutions such as sodium or potassium silicate solutions, known as water glass, are to some extent an exception to this rule. These solutions contain numerous varieties of alkali metal silicates, e.g.

$Me_2O \cdot SiO_2$; $Me_2O \cdot 2SiO_2$; $Me_2O \cdot 3SiO_2$; $Me_2O \cdot 4SiO_2$; $Me_2O \cdot 5SiO_2$ (Me=alkali metal)

These water glasses have long been used as adhesives or mixing liquids for making up special cements. The hardening of these water glasses, which are used in the form of approximately 40% solutions, is either an exclusively physical drying process in which the water evaporates and the alkali metal silicate forms a glassy residue or alternatively it is brought about by reaction of the $CO_2$ from the atmosphere with the alkali metal silicate, in which case solidification is effected by precipitation of silicic acid or a silicate gel. In most cases, both these processes take place side by side. This type of hardening of silicate solutions naturally takes considerable time and may extend over several weeks in the case of thick-walled parts or parts which are kept moist. This hardening of silicate solutions or precipitation of silicic acid or silicate gels can be considerably accelerated by the addition of acids or precipitating agents such as methanol, ethanol, glycol or organic and inorganic salts. These reactions, however, cannot be utilized in a technically advantageous manner for the above mentioned hardening process of silicate solutions because solidification takes place immediately on addition of the precipitating agents so that there is no time for homogenization of the mixture, and the gel therefore precipitates in the form of lumps. The precipitation reaction can be slowed down only by using very high dilutions both of the silicate solution and of the precipitating agent. In most cases this leads to the formation of metastable silicate or silicic acid sols although these do solidify instantaneously when reaching a critical state and produce low strength gels.

We have now found a process for the production of molded articles from an aqueous silicate solution optionally with the addition of inorganic and/or organic constituents wherein the aqueous silicate solution optionally containing inorganic and/or organic constituents is mixed with a pyrocarbonic acid ester and/or an anhydride of a carboxylic and carbonic acid ester and these mixtures are introduced into the required mold either at the same time or sequentially in a state which may vary from fluid to solid.

This invention also relates to molded articles which are produced by the process according to the invention in an anhydrous or aqueous form. The products of the process according to the invention are understood to include also foamed molded article.

The term "molded article" is understood in the context of this invention to include any structures in a wider sense, e.g. also coatings, bonds, mesh structures, joints, seals and fillings of any kind.

With the aid of the process according to the invention it is surprisingly possible to control the hardening process of aqueous alkali metal silicate solutions of various concentrations, even high concentrations, so that the solutions pass through stages of slowly increasing viscosity until they reach a gel stage and finally a hard, solid state. In other words controllable silicic acids or silicates of increasing degrees of condensation are obtained which can then, by suitable control of the reaction, be converted into completely cross-linked silicic acid or silicate gels. This process may be carried out at temperatures varying from the solidification point of the silicate solutions, which may be below 0° C., to temperatures above 100° C. The hardening times can be varied from a few seconds to several hours according to the temperature and concentration ratios of the reaction mixture so that it is possible to work up the reaction mixture in any desired consistency varying from that of a thin liquid to that of a viscous liquid, a paste or even a solid. This type of hardening process can be achieved according to the invention by mixing the silicate solutions with pyrocarbonic acid esters and/or anhydrides of carboxylic-carbonic acid esters by suitable means.

The technical advantage of this process lies in the fact that the reaction mixtures which contain silicate solutions can now be subjected to foaming or molding processes, optionally in a continuous manner, at any stage of viscosity from highly fluid to highly viscous and thread-drawing to semi-solid or solid, with the hardening times adjustable to almost any value, so that they are comparable to organic reaction systems such as those found in conventional molding resins based on polyesters, polyepoxides or polyurethanes and are analogous to them in their possibilities of application. In addition, molded articles produced by this process have the advantage that they can be made completely flame-resistant both in the aqueous and in the dry state without the aid of physiologically and ecologically undesirable agents such as halogen compounds, antimony compounds or phosphorus compounds.

According to the process of the invention, the silicate solutions and their mixtures with solid, liquid or gaseous organic or inorganic constituents can pass through all stages of viscosity from that of a thin liquid to a solid within lengths of time which can be adjusted to vary from a few seconds to several hours. Furthermore, a reaction mixture which has been converted into the solid state at a low temperature, for example about 20° C., with the aid of a suitable hardener can be rendered viscous or plastic again by heating it to an elevated temperature, for example about 100° C., optionally at elevated pressure, so that it can be further processed in this state before it is finally hardened.

The aqueous silicate solutions used may be true or colloidal solutions of silicates in water or aqueous media, e.g. solutions of ammonium silicates or metal silicates. Alkali stabilized silicic acid salts may also be used.

The preferred silicate solutions are alkali metal silicate solutions, e.g. sodium and/or potassium silicate solutions. Very suitable starting materials are the so-called water glass solutions which have long been available commercially. This dissolved silicate need not necessarily have the formula $$Na_2O \cdot 3\text{--}4SiO_2$$

which is the basis of water glass. The proportion of alkali metal oxide to $SiO_2$ may vary e.g. from that of $Na_4SiO_4$ to that of polysilicates with various degrees of polymerization in which the proportion of alkali metal oxide to $SiO_2$ is less than 1:1, e.g. 0.1:1. The necessary condition to be observed, however, is that the silicate solution must be fluid. The permissible concentration of these solutions is limited upwardly to about 60% by the requirement for fluidity although more highly concentrated solutions could be worked up e.g. in a kneading apparatus at elevated temperatures. The lower limit of concentration is determined by the fact that solutions which have a solids content of less than about 5% generally only produce gels with insufficient solidity. It is preferred to use silicate solutions with a solids content of from about 10 to 50% by weight.

The inorganic or organic additives should be understood to mean substances which may be either soluble or insoluble in the silicate solution either in their gaseous, liquid or solid form provided they are compatible with the silicate solution, i.e. they must not bring about precipitation of the silicate solution while it is still in the process of being mixed.

These additives may have the character of fillers, diluents or special auxiliary agents.

The fillers may be solid inorganic or organic substances e.g. in the form of powders, granulates, wire fibers, dumbbell shaped particles, crystallites, spirals, rods, beads, hollow beads, foam particles, fleeces, woven or knitted fabrics, bands, small pieces of foil, etc., for example dolomite, chalk, clay, asbestos, basic silicic acids, sand, talcum, iron oxide, magnesium oxide, aluminum oxide and hydroxides, alkali metal silicates, perlites, vermiculites, mixed silicates, calcium silicates, calcium sulfates, aluminosilicates, cements, basalt wool or powder, glass fibers, carbon fibers, glass powder, graphite, carbon black, Al, Fe, Cu or Ag powder, molybdenum sulfide, steel wool, bronze or copper weaves, silicon powder, expanded clay particles, hollow glass beads, particles of lava or pumice stone, wood shavings, sawdust, cork, cotton, straw, popcorn, coke and particles of filled or unfilled, foamed or unfoamed, stretched or unstretched organic polymers. A few examples of the large variety of suitable organic polymers, which may be used either in the form of powders, granulates, foam particles, beads, hollow beads, foamable but not yet foamed particles, fibers, tapes, woven fabrics, fleeces, etc., are: polystyrene, polyethylene, polypropylene, polyacrylonitrile, PVC, chlorine rubber, polyvinylidene chloride, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulfones, polycarbonates and, of course, any copolymers thereof provided they are compatible with the silicate solutions. Some fillers which should be especially mentioned are dolomite, chalk, asbestos, talcum, glass in any form, carbon, polystyrene, polyvinyl chloride and polyethylene, either foamed or unfoamed, terephthalic acid polyesters, polyacrylonitrile, polyamides, polypropylene and polyurethanes which may be in the form of fibers, fleeces, woven fabrics or foams.

According to one particular embodiment of the process of the invention, the preliminary stages of the solid polymers, provided they are compatible with the silicate solutions, may be used as added constituents or fillers in a solid or liquid form any may then be polymerized or hardened by suitable reactions during or after the hardening process of the silicate solutions. Suitable substances which may be used in this way are, for example, styrene, mixtures of stryene and unsaturated polyesters, e.g. maleic acid polyesters, diallyl phthalate or methyl methacrylate or solutions of monomers in polymers.

Gaseous constituents may also be added to the silicate solutions as high-bulk fillers in accordance with the process of the invention. These gases, which may be oxygen, nitrogen, $SF_6$, hydrogen, noble gases, methane, $CF_4$ but preferably air, may be added to the silicate solutions optionally with the application of excess pressure and optionally in the form of mixtures with the other additives. When adding these gases, it is advantageous also to add foam-forming and foam-stabilizing auxiliary agents which will be described hereinafter.

In this way, foamed molded articles can be obtained in accordance with the invention. The addition of the foam-forming gases as incidentally also of the other fillers, diluents or other auxiliary agents, in other words the additive constituents, may be completely or partly carried out in one or more process steps during or immediately after the addition of the additives which effect the hardening reaction.

The additives used as fillers are generally added in such quantities that the amount of dissolved silicate in the reaction mixture is if possible at least more than about 5% by weight and preferably between about 10 and 50% by weight.

Diluents may also be used as additives; these may be either aqueous or non-aqueous.

Apart from the use of polymer solutions such as solutions of polystyrene, polyesters or rubber in petroleum hydrocarbons, benzene or chloroform or solutions of phenol-, urea- or melamine-formaldehyde precondensates in water, one instance which constitutes a boundary case in the use of fillers is the use of polymer dispersions as diluents. The polymer dispersions which may be used for this purpose may be obtained by conventional processes but they must be compatible with the silicate solutions in two respects, i.e. they must not precipitate the silicate solution nor must they themselves be precipitated by the silicate solution. This condition is fulfilled by many dispersions of polyurethanes, polyvinyl acetate, polystyrene, polybutadiene, polyacrylates, polyacrylonitrile, polyethylene, polyvinyl chloride or copolymers thereof which are available commercially or which can be prepared by processes known in the art but their suitability must be tested in each case by simple preliminary tests since it often depends on the emulsifier used. These diluents may be used in such quantities that the silicate content of the mixtures is above about 5% by weight and preferably between about 10 and 50% by weight.

Other diluents may also be used in about the same proportions provided they satisfy the condition of compatibility, e.g. aqueous formaldehyde solutions or formaldehyde condensates or compounds which are insoluble in the silicate solution; these may also serve as diluents for the hardeners which are subsequently added. The following are examples of such diluents: aliphatic and aromatic hydrocarbons such as benzene, toluene, xylene, styrene, petroleum hydrocarbons, paraffin oil, paraffin waxes, fatty acid esters, diethyl carbonate, glycol diacetate, diethyl phthalate, silicones, triethyl phosphate, ethyl benzoate, butyl acetate, ethyl orthoformate, oleic acid glycerides, chlorinated hydrocarbons such as halomethanes, perchloro ethylene, chlorobenzene, fractions of natural oils, mineral oil fractions, and bitumen. Also to be included among these diluents are the blowing agents mentioned hereinafter in the description of the technical methods of carrying out the process, which are mostly volatile substances having boiling points in the range of about −20° C. to 180° C., preferably −15° C. to 140° C.; these blowing agents are preferably insoluble in the silicate solution. These substances include, for example, saturated or unsaturated hydrocarbons having 3 to 12 carbon atoms such as propane, isobutylene, butadiene, isoprene, butane, pentane, heptane, octane, isobutane, isooctane, cyclohexane, light-fraction petroleum hydrocarbons, petroleum ether, halogenated saturated or unsaturated hydrocarbons such as chloromethane, methylene chloride, chloroform, carbon tetrachloride, fluorotrichloromethane, difluorodichloromethane, trifluorochloromethane, chloroethane, vinyl chloride, vinylidene chloride, dichloroethane, trichloroethylene and perchloroethylene. The function of these blowing agents is to cause the reaction mixture, which passes through stages of increasing viscosity during the hardening process, to be converted into a foam before the final hardening or during a subsequent heating process.

The special auxiliary agents from the group of inorganic or organic auxiliary agents include not only dyes, perfumes, thickeners such as methyl cellulose and starch and compounds which render the reaction mixture hydrophobic such as silicones or fluorinated compounds but in particular also wetting agents, foam stabilizers, pore regulators and ionic or non-ionic emulsifiers. Particularly important among these auxiliary agents are emulsifying substances which can considerably facilitate the incorporation of the hardeners and other additives. In addition to the non-ionic compounds, which are mostly products of addition of alkylene oxides such as ethylene oxide to hydrophobic siloxanes, fatty acids, fatty alcohol or phenols or copolymers of ethylene oxide and propylene oxide, it is particularly advantageous to use alkyl sulfonates which have from 10 to 18 carbon atoms in the alkyl radical. These compounds are highly compatible with silicate solutions and efficient emulsifiers for systems with a continuous aqueous phase and they produce a good foaming effect. These auxiliary agents are used either in their pure form or preferably in the form of their aqueous solutions or dispersions or also as solutions in diluents or hardeners. The reaction mixture may contain them in quantities of from about 0.05 to 20% by weight, preferably about 0.5 to 15% by weight. These quantities may be exceeded in special cases, for example if the molded article to be produced is required to be very strongly hydrophilic or is intended to be used as a vehicle for these substances.

The pyrocarbonic acid esters and/or anhydrides of carboxylic-carbonic acid esters used as hardeners are substances which have been known for a long time. They have been described in German Patent Specification Nos. 1,181,195, 1,210,853 and 1,133,727. One may also use mixtures of different pyrocarbonic acid esters and/or anhydrides of carboxylic-carbonic acid esters for the purpose of adjusting the thickening and hardening times to different values. They may also be used as mixtures with other additives which solidify alkali metal silicate solutions, e.g. with the additives described in Belgian Patent Specification No. 753,761.

Pyrocarbonic acid esters are described in German Patent Specification No. 1,181,195. It is also possible to use mixtures of different pyrocarbonic acid esters, e.g. rapidly reacting and slowly reacting pyrocarbonic acid esters, in order to adjust the thickening and hardening times to different values, e.g. mixtures of dimethyl or preferably diethyl pyrocarbonates with di-$n$-propyl, di-isopropyl, di-$n$-butyl or di-iso-butyl pyrocarbonates. Mixtures with other additives which also solidify alkali metal solutions, e.g. the additives mentioned in Belgian Patent Specification No. 753,761, may also be used. The use of diethyl pyrocarbonate is preferred although pyrocarbonic acid esters of higher alcohols may also be used, especially in cases where longer hardening times are desired because, for example, the hardening times can be increased tenfold when using di-$n$-propyl pyrocarbonate under otherwise the same conditions and about 20-fold when using dibutyl pyrocarbonate. The pyrocarbonic acid esters used should in principle be symmetrical or asymmetrical pyrocarbonic acid esters of alcohols having 1 to 18 carbon atoms, preferably 2 to 4 carbon atom alkanols, for example the dimethyl, diethyl, dipropyl, diisopropyl, dibutyl or diisooctyl esters of pyrocarbonic acid. The pyrocarbonic acid esters should be used in amounts of about 0.01–30% by weight, preferably about 0.2–20% by weight, based on the amount of silicate.

The anhydrides of carboxylic-carbonic acid esters may be prepared, for example, by reacting chloroformic acid esters with alkali metal salts of organic carboxylic acids and have the following general formula:

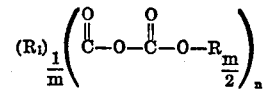

$n$=an integer of from 1 to 100, e.g. when $R_1$ has an oligomeric or polymeric character (e.g. polystyrene derivatives), preferably 1–3.

$R_1$=a mononuclear or polynuclear substituted or unsubstituted aromatic radical, araliphatic radical or saturated or unsaturated aliphatic radical with the number of carbon atoms ranging from 1 to about 5000, preferably a six-membered aromatic ring.

$R_{m/2}$=a substituted or unsubstituted aromatic or araliphatic or aliphatic radical derived from an $m$-valent alcohol. $R_2$ is preferably a monovalent aliphatic radical, i.e. $m=1$, with 1–8 and preferably 1–4 carbon atoms, e.g. ethyl.

Below are given examples of types of carboxylic-carbonic acid ester anhydrides corresponding to the above formula, classified according to their theoretically possible starting components and possible variations.

Carboxylic-carbonic acid ester anhydrides obtained theoretically from: one mole of carboxylic acid and $n$ moles of a chloroformic acid ester of:

| | |
|---|---|
| Benzoic acid | 1 mole of methanol. |
| Benzoic acid, $p$-hydroxy- | 1 mole of ethanol. |
| Benzoic acid | 1 mole of $n$-propanol. |
| Benzoic acid | 1 mole of isopropanol. |
| Benzoic acid | 1 mole of $n$-butanol. |
| Benzoic acid | 1 mole of isooctanol. |
| Terephthalic acid | 2 moles of ethanol. |
| Isophthalic acid | 2 moles of ethanol. |
| $p,p'$-Diphenylmethane dicarboxylic acid | 2 moles of ethanol. |
| Adipic acid | 2 moles of ethanol. |
| Oleic acid | 1 mole of $n$-propanol. |
| Oleic acid | 1 mole of ethanol. |
| Stearic acid | 1 mole of butanol. |
| Methacrylic acid | 1 mole of ethanol. |
| Acrylic acid | 1 mole of ethanol. |
| Cinnamic acid | 1 mole of ethanol. |
| Benzoic acid | 0.5 mole of butane-1,4-diol. |

The preferred anhydrides are the anhydride of benzoic acid and ethyl chloroformate and the anhydride of isophthalic acid and 2 mole of ethyl chloroforate, viz benzoic acid-carbonic acid ethyl ester anhydride and (isophthalic acid-carbonic acid ethyl ester) dianhydride.

The carboxylic-carbonic acid ester anhydrides should be used in amounts of from about 0.01 to 30% by weight, preferably about 0.2 to 20% by weight, based on the amount of silicate.

The choice of hardener is not the only factor which influences the length of hardening time required up to solidification of the reaction mixtures used in the process. For any given type of hardener, the hardening time also increases with decreasing quantity of hardener used and decreasing temperature of the reaction mixture as well as with decreasing degree of distribution of the hardener and again the quality and quantity of the emulsifier used have some influence on the hardening time. In addition, the hardening time can be increased by diluting the hardener with the diluents already described above. Here again the degree of distribution and hence the emulsifier used as well as the mixing technique employed have a considerable bearing on the hardening time.

From what has been said above it is clear that the process here described enables the hardening times of the reaction mixture and hence the length of times during which the system passes through states of increasing viscosity up to solidification to be controlled by the interplay of a plurality of parameters, one particular advantage being that the process can be carried out in the temperature range of from about 10° C. to 70° C. which is technically the most convenient at which the materials are easiest to handle.

If desired, the silicate solutions, optionally already containing inorganic and/or organic constituents, may, of course, first be converted into a state of moderately high viscosity by the addition of a sub-equivalent quantity of hardener, i.e. a quantity of hardener which is sufficient to effect condensation of the silicates or silicic acid to produce higher molecular weight aggregates but insufficient to effect final cross-linking and hence solidification, and the resulting moderately highly viscous intermediate product may then be stored or be subjected to any suitable technical manipulations and hardened to the required degree at a later date by the addition of further quantities of hardener.

The behavior of the reaction mixtures opens up numerous possibilities of application for the process of the invention and hence different fields of application, some of which will be briefly outlined by way of example below. It is possible to choose in each individual case, according to the intended technical application of the product, whether the water contained in the hardened mixtures should be left in the molded article as a desired constituent and whether the molded article should be protected against loss of water by applying a suitable coating or laminate or whether the water should be partly or completely removed by suitable drying processes, e.g. in a heating cupboard or by hot air, infrared heating or ultrasound or high-frequency heating.

The reaction mixture, with or without a blowing agent, may, for example, be painted on hot or cold supports or supports irradiated with infrared radiation, micro radiation or high-frequency radiation or it may be passed through a suitable mixing apparatus and then sprayed on these supports as a homogeneous layer or a foam either with the aid of compressed air or by the airless spraying process and then left to harden on the supports to provide a filling or insulating or fire-retardant coating. The pourable or plastic reaction mixture may also be forced, poured or injected into cold or heated molds which may be either relief forms or solid or hollow molds and left to harden in these molds, optionally under pressure and optionally using a centrifugal casting process at room temperature or temperatures of up to 200° C. Reinforcing elements such as in organic and/or organic or metal wires, fibers, fleeces, foams, fabrics or reinforcing skeletons, etc. may be added. This may be carried out for example by the winding process for hollow containers or by a process of impregnating fiber mats or by processes in which the reaction mixtures and reinforcing fibers are together applied to the mold, e.g. by means of a spray device. The molded products which can be produced in ths way may be used as building elements, e.g. in the form of cellular or non-cellular sandwich panels which may be produced either directly as such or by subsequently laminating with metal, glass or synthetic resin, for example, a particular advantage of these building elements being their fire resistance in the moist or dry state. Alternatively, the molded products may be used as hollow bodies, for example as containers for goods which have to be kept moist or cool, or they may be used as filter materials or exchangers, as catalyst carriers or carriers of active substances, as decorative elements, furniture components and as filling for cavities. They may also be used as heavy-duty lubricants and coolants, e.g. for metal extrusion processes. The reaction mixtures may also be spun during the hardening process to produce fibers which may be used as reinforcing elements, insulating materials or fabrics, optionally after a tempering process. If the hardening reaction mixture is extruded while it is still in a plastic state, it is possible to obtain strands of any form which may also contain fillers and/or blowing agents. If such a strand is granulated, the moisture granulates can be foamed by a sudden burst of heat (e.g. hot air, steam, heating liquids, high-frequency heating) to produce foam products which may have unit weights of less than 0.4 gram per cc. The foaming of these granulates can be further improved if liquid or solid blowing agents such as petroleum ether, light fraction petroleum hydrocarbons, benzene, toluene or halogenated hydrocarbons having from 1 to 6 carbon atoms such as chlorotrifluoromethane, trichlorofluoromethane, dichlorofluoromethane, methylene chloride, chloromethane, chloroform, carbon-tetrachloride, trichloroethylene, perchloroethylene, vinyl chloride, butyl acetate, azodiisobutyronitrile, azodicarbonamide, nitroso compounds and ureas, i.e. compounds which boil at temperatures of up to 180° C. or which liberate gases which do not cause precipitation of water glass solutions, are added to the reaction mixture from which the granulates are produced before foaming is carried out. According to another variation of the process, foaming may be carried out simultaneously with hardening, e.g. by preparing the reaction mixture in a mixing chamber and at the same time adding a highly volatile compound which does not have a precipitation effect on water glass solutions alone, for example dichlorodifluoromethane, trichlorofluoromethane, butane, isobutylene, isopentane or vinyl chloride so that with suitable choice of the mixing temperature the reaction mixture leaving the mixing chamber foams up due to evaporation of the blowing agent and at the same time hardens due to the action of the carboxylic-carbonic acid ester anhydride and the resulting foam, which may still contain emulsifiers and foam stabilizers and other auxiliary agents, is fixed. Furthermore, the reaction mixture may be blown up into a foam while still highly fluid by introducing gases such as air, methane, $CF_4$ or noble gases, optionally under pressure, and this foam may then be introduced into the required mold and hardened. Alternatively, the silicate solution, which may contain foam stabilizers such as wetting agents, foam-forming agents, emulsifiers and optionally other organic or inorganic fillers or diluents, may be converted into a foam by gasification with the above mentioned gases and this foam may then be mixed with the hardener used as precipitating agent in a mixing apparatus and left to harden.

The foams obtainable in this way may be used in the dry or moist state, optionally after a compression or tempering process and optionally under pressure, as insulating materials, cavity fillings, acoustic panels, packaging materials and building materials with high solvent resistance and flame resistance.

The reaction mixtures may also be converted into water in oil emulsions and hardened in this form. In that case, the hardened material is obtained in the form of beads. These beads may either be expanded as described above and/or used in the aqueous or dry form as fillers for other reactive systems. For example, if these foamed, porous or solid beads or also granulates produced in any other way from the hardened mixtures are used as fillers for gypsum, concrete or casting resin systems of polyesters, polyepoxides or polyurethanes, it is possible to produce molded products which contain these dried or aqueous hardened silicate particles in large quantities and therefore have a considerable heat resistance or insulating effect or fire resistance.

The production of reinforced or unreinforced panels using the reaction mixtures according to the invention may be carried out not only by a simple process of molding or impregnation but may also be carried out in presses at any temperatures. On the other hand, the mixtures which are hardened in accordance with the process are also particularly suitable for use as impregnating agents or binders for fleeces, woven or knitted fabrics, foam plastic foils, whiskers or organic fiber materials or foams in which the cavities between the fibers or cell walls need not be completely filled by the reaction mixture so that a highly porous heat-insulating or sound-insulating material which may also be non-combustible is obtained, the strength of which depends both on the nature of the fibers and on the quantity of the mixture introduced which is in the process of hardening. It is also possible to impregnate such fleeces or fabrics with a reaction mixture which is adjusted to harden only slightly. Mats impregnated in this way may subsequently be shaped and completely hardened at elevated temperatures by calendering or better still by pressing.

So long as the reaction mixture which is in the process of hardening, and which may also be in the process of foaming, is still in a workable state, it is possible to incorporate organic and/or inorganic particles which are capable of foaming up or have already been foamed, e.g. expanded clay, expanding gas, wood, popcorn, cork, hollow beads of synthetic resin materials, e.g. vinyl chloride polymers, polyethylene, styrene polymers or foam particles of these substances or also of polymers such as polysulfone, polyepoxide, polyurethane or urea-formaldehyde, phenol formaldehyde or polyimide polymers, whereby insulating materials which have excellent fire resistance are obtained.

The shaped products which can be produced by the process according to the invention may be added to soil in a crumbled form, optionally with the addition of fertilizers and plant protective agents to improve its agricultural consistency. Molded products which have a high water content may be used as substrates for the propagation of seedlings or cuttings and the cultivation of plants and care of cut flowers. Terrain which is impassable or too loose such as dunes or swamps can be made firm by spraying them with the hardenable mixtures so that they become passible and are protected against erosion within a short time. The reaction mixtures may also be sprayed in combination with seed, by a spraying process which may be accompanied by foaming, so that seed can be planted in terrain which would otherwise be unsuitable.

The reaction mixtures proposed in this invention are also important in cases of fire or catastrophe, where they can be sprayed on an article to protect it. In that case, the water on the surface of the article which is being protected is retained and cannot evaporate rapidly and consequently the article is effectively protected against the effect of fire, heat or radiation because so long as the hardened mixture still contains water it cannot be heated much above 100° C. or absorb infrared or nuclear radiation.

As these mixtures are easily sprayable, they must be sprayed for example, on fabrics, grids or only on the walls to produce effective barriers and protective layers in mining in the case of accident or also for routine work. In this case, it is particularly important that rapid hardening can be achieved. The protective barriers produced in this way can be made to be non-combustible and physiologically harmless even in the event of severe heating.

The mixtures according to the invention may also be used in underground and surface engineering and road building for the erection of walls and igloos, for sealing, pointing, plastering, laying foundations, insulating and decorating and as coating, flooring composition and paving material. They should also be considered for use as adhesives or mortar or molding compositions, optionally with inorganic or organic fillers. For this purpose they may also be prepared as foaming or foamed compositions.

Since the hardened molded products produced by the process according to the invention may be very porous after drying, they are suitable for use as drying agents because they are then able to absorb water again, but they may also be charged with active substances or used as catalyst carriers.

The properties of the molded articles in their aqueous or dried state can be adjusted as desired by means of auxiliary substances such as emulsifiers, detergent raw materials, dispersing agents, wetting agents, scents or substance which render the product hydrophobic; these substances may either be used in the reaction mixture or introduced subsequently.

On the other hand, the molded products, either in the aqueous or dried or impregnated state, may subsequently be lacquered, coated, laminated, galvanized, vapor-coated, bonded or flocked. Subsequent shaping processes may be carried out on the molded products either in the aqueous or dried state, for example by sawing, milling, drilling, planing or polishing.

The molded articles, with or without fillers, may be further modified in their properties by thermal foaming processes, charring, oxidation processes, extrusion, hot pressing, sintering processes or surface melting or other compression processes.

Suitable materials to be used for the molds are inorganic and/or organic foamed or non-cellular materials such as metals, e.g. iron, nickel or refined steel, lacquered or e.g. Teflon coated aluminum, porcelain, glass, gypsum, cement, wood, paper, cardboard, synthetic resins such as PVC polyethylene, polyurethane, ABS and polycarbonate.

Alternatively, a support material such as wood or polyurethane foam or polystyrene may be impregnated, moistened or caused to swell with pyrocarbonic acid esters and then brought into contact with silicate solutions, the hardening reaction then taking place on the pretreated surfaces.

The foams obtainable by the process according to the invention may be dried on the surface or, if they are substantially permeable structures such as foams with a higher degree of open cells or porous materials, they may also be dried by centrifuging or by vacuum treatment or by blowing air through them or rinsing them with liquids or gases which remove the water contained in them (optionally with heating), such as methanol, ethanol, acetone, dioxane, benzene, chloroform and the like or air, $CO_2$ or super-heated steam. The moist or dry molded articles may also be after-treated in analogous manner by rinsing or impregnating them with aqueous or non-aqueous acid, neutral or basic liquids or gases, e.g. hydrochloric acid, phosphoric acid, formic acid, acetic acid, ammonia, amines, organic or inorganic salt solutions, lacquer solutions, solutions of monomers which have yet to be polymerized or which have already been polymerized polymer latices, dye solutions, galvanization baths, solutions of catalysts or of catalyst precursors and scents.

The description given above is intended to illustrate by way of example the general possibilities of technical application of the production of molded articles by the process according to the invention, i.e. to explain their possible uses which are already determined by the production process.

The molded articles obtained may subsequently be modified by washing or treating them with $CO_2$, acid gases or aqueous or non-aqueous acids, dyes or scents.

The process according to the invention will now be explained with the aid of the following examples wherein all parts given are parts by weight unless otherwise indicated.

EXAMPLE 1

This example illustrates how the hardening times of silicate solutions depend on the various parameters of the process.

For this purpose, 25 parts of a silicate solution are mixed with the various additives by stirring in a beaker with a rotating glass rod under as far as possible uniform conditions and the hardener is then introduced while stirring is continued. From that moment on, the hardening time is measured, i.e. the time which elapses until the mixture is no longer stirrable.

| | | | | | | | | | | |
|---|---|---|---|---|---|---|---|---|---|---|
| 40% Na water glass, parts | 25 | 25 | 25 | 25 | 25 | 25 | 25 | 25 | 25 | |
| 40% K water glass, parts | | | | | | | | | | 25 |
| 50% Na-$C_{10-18}$ alkyl sulfonate solution, parts | 1.25 | 1.25 | 1.25 | 1.25 | | 0.25 | | | 1.8 | 1.8 |
| Petroleum ether, parts | | | | | | | | | | |
| Butyl acetate, parts | | | | | | | | | | |
| Chloroform, parts | | | | | | | | | | |
| Paraffin oil, parts | | | | | | | | | | |
| Solid $Na_2SiO_3$, parts | | | | | | | | | | |
| $H_2O$ | | | | | | | | | | |
| Mixing temperature, °C | 21 | 21 | 21 | 21 | 21 | 20 | 21 | 21 | 21 | 21 |
| Diethyl pyrocarbonate, parts | 0.1 | 0.5 | 1 | 5 | 1 | | | | | |
| Dibutyl pyrocarbonate, parts | | | | | | | 1 | 3 | 3 | 3 |
| Di-n-propyl pyrocarbonate, parts | | | | | | 1 | | | | |
| Viscous after, seconds | 180 | 29 | 28 | 26 | 33 | 250 | 700 | 680 | 550 | 500 |
| No longer stirrable after, seconds | | 37 | 37 | 35 | 49 | 340 | 900 | 900 | 770 | 710 |
| Solid after, seconds | | 49 | 41 | 40 | 60 | 410 | 1,000 | 1,000 | 1,000 | 900 |

| | | | | | | | | | |
|---|---|---|---|---|---|---|---|---|---|
| 40% Na water glass, parts | | 25 | 25 | 25 | 25 | 25 | 25 | 25 | 25 |
| 40% K water glass, parts | 25 | 25 | | | | | | | |
| 50% Na-$C_{10-18}$ alkyl, parts | | | | | | | | | |
| 50% Na-$C_{10-18}$ alkyl sulfonate solution, parts | 1.25 | 1 | 1 | 1 | 1 | 1 | 1 | 1 | 0.5 | 0.5 |
| Petroleum ether, parts | | | | | | | | | |
| Butyl acetate, parts | | | | | | | | | |
| Chloroform, parts | | | | | | | | | |
| Paraffin oil, parts | | | | | | | | | |
| Solid $Na_2SiO_3$, parts | | | | | | | | | |
| $H_2O$, parts | | | | | | | | | |
| Mixing temperature, °C | 21 | 21 | -5 | 0 | 10 | 35 | 45 | 45 | 19 | 19 |
| Diethyl pyrocarbonate, parts | 1 | 1 | 1 | 1 | 1 | 1 | 1 | 1 | | 1 |
| Dibutyl pyrocarbonate, parts | 1 | | | | | | | | | |
| Di-n-propyl pyrocarbonate, parts | | | | | | | | | | |
| Viscous after, seconds | 28 | 27 | 135 | 110 | 47 | 19 | 9 | 15 | 33 | 45 |
| No longer stirrable after, seconds | 30 | 37 | 200 | 188 | 60 | 25 | 12 | 24 | 55 | 75 |
| Solid after, seconds | 45 | 48 | 380 | 360 | 90 | 45 | 30 | 50 | 69 | 89 |

| | | | | | | | | | |
|---|---|---|---|---|---|---|---|---|---|
| 40% Na water glass, parts | 25 | 25 | 25 | 25 | 25 | 25 | 25 | 25 | 25 | 25 |
| 40% K water glass, parts | | | | | | | | | | |
| 50% Na-$C_{10-18}$ alkyl, parts | | | | | | | | | | |
| sulfonate solution, parts | 0.5 | 0.5 | 0.5 | 1.25 | 1.25 | 12.5 | 1.25 | 1.25 | 1.25 | 1 |
| Petroleum ether, parts | | | | 0.1 | 0.25 | 0.5 | 1 | 1.5 | 3 | |
| Butyl acetate, parts | | | | | | | | | | 0.5 |
| Chloroform, parts | | | | | | | | | | |
| Paraffin oil, parts | | | | | | | | | | |
| Solid $Na_2SiO_3$, parts | | | | | | | | | | |
| $H_2O$, parts | 12.5 | 12.5 | 25 | | | | | | | |
| Mixing temperature, °C | 19 | 19 | 19 | 18 | 18 | 18 | 18 | 18 | 18 | 18 |
| Diethyl pyrocarbonate, parts | 1 | 2 | 1 | 0.1 | 0.25 | 0.5 | 1 | 1.5 | 3 | 0.5 |
| Dibutyl pyrocarbonate, parts | | | | | | | | | | |
| Di-n-propyl pyrocarbonate, parts | | | | | | | | | | |
| Viscous after, seconds | 100 | 58 | 240 | 300 | 43 | 35 | 34 | 34 | 33 | 33 |
| No longer stirrable after, seconds | 125 | 75 | 270 | | 50 | 45 | 44 | 42 | 40 | 42 |
| Solid after, seconds | 145 | 85 | 300 | | 65 | 60 | 60 | 55 | 50 | 60 |

| | | | | | | | | | | |
|---|---|---|---|---|---|---|---|---|---|---|
| 40% Na water glass, parts | 25 | 25 | 25 | 25 | 25 | 25 | 25 | | 25 | 25 | 25 |
| 40% K water glass, parts | | | | | | | | | 1 | 1 | 1 |
| 50% Na-$C_{10-18}$ alkyl, parts | 1 | 1 | 1 | 1 | 1 | 0.5 | 0.5 | 0.5 | | | |
| 50% Na-$C_{10-18}$ alkyl sulfonate solution, parts | | | | | | | | | | | |
| Petroleum ether, parts | | | | 1 | 1 | | | | | | |
| Butyl acetate, parts | 1 | | | 1 | 1 | | | | | | |
| Chloroform, parts | | | 1 | 2 | | | | | | | |
| Paraffin oil, parts | | | | | 1 | | | | | | |
| Solid $Na_2SiO_3$, parts | | | | | | | | | | | |
| $H_2O$, parts | | | | | | | | | 0.5 | 1 | 2 |
| Mixing temperature, °C | 18 | 18 | 18 | 18 | 18 | 20 | +20 | ++20 | 20 | 20 | 20 |
| Diethyl pyrocarbonate, parts | 1 | 1 | 2 | 1 | 1 | 1 | 1 | 1 | 1.5 | 1.5 | 1.5 |
| Dibutyl pyrocarbonate, parts | | | | | | | | | | | |
| Di-n-propyl pyrocarbonate, parts | | | | | | | | | | | |
| Viscous after, seconds | 32 | 42 | 41 | 34 | 40 | 35 | 30 | 25 | 35 | 39 | 41 |
| No longer stirrable after, seconds | 44 | 52 | 52 | 44 | 50 | 54 | 45 | 40 | 41 | 42 | 44 |
| Solid after, seconds | 55 | 65 | 60 | 60 | 60 | 65 | 60 | 58 | 60 | 55 | 55 |

| | | | | | | | | | |
|---|---|---|---|---|---|---|---|---|---|
| 40% Na water glass, parts | 25 | 25 | 25 | 25 | 25 | 25 | 25 | 25 | 25 |
| 40% K water glass, parts | | | | | | | | | |
| 50% Na-$C_{10-18}$ alkyl sulfonate solution, parts | 1.25 | 1.25 | 1.25 | 1.25 | | 0.25 | | | 1.8 |
| Petroleum ether, parts | | | | | | | | | |
| Butyl acetate, parts | | | | | | | | | |
| Chloroform, parts | | | | | | | | | |
| Paraffin oil, parts | | | | | | | | | |
| Solid $Na_2SiO_3$, parts | | | | | | | | | |
| $H_2O$ | | | | | | | | | |
| Mixing temperature, °C | 21 | 21 | 21 | 21 | 21 | 20 | 21 | 21 | 21 |
| Carboxylic-carbonic acid anhydride of isophthalic acid and 2 moles of chloroformic acid ethyl ester (85% solution in toluene), parts | 0.1 | 0.5 | 1 | 5 | 1 | | | | |
| Carboxylic-carbonix acid anhydride of benzoic acid and 1 mole of chloroformic acid ethyl ester (85% solution in toluene), parts | | | | | | | | 3 | 3 |
| Carboxylic-carbonic acid anhydride of methacrylic acid and 1 mole of chloroformic acid ethyl ester, parts | | | | | | 1 | | | |
| Viscous after, seconds | >180 | 50 | 15 | 10 | 39 | 25 | 19 | 15 | 12 |
| No longer stirrable after, seconds | | 70 | 23 | 14 | 49 | 34 | 41 | 20 | 17 |
| Solid after, seconds | | 100 | 60 | 40 | 60 | 41 | 75 | 60 | 60 |

TABLE—Continued

| | | | | | | | | | |
|---|---|---|---|---|---|---|---|---|---|
| 40% Na water glass, parts | | | 25 | 25 | 25 | 25 | 25 | 25 | 25 |
| 40% K water glass, parts | 25 | 25 | 25 | | | | | | |
| 50% Na-C$_{10-18}$ alkyl sulfonate solution, parts | 1.8 | 1.25 | 1 | 1 | 1 | 1 | 1 | 1 | 1 |
| Petroleum ether, parts | | | | | | | | | |
| Butyl acetate, parts | | | | | | | | | |
| Chloroform, parts | | | | | | | | | |
| Paraffin oil, parts | | | | | | | | | |
| Solid Na$_2$SiO$_3$, parts | | | | | | | | | |
| H$_2$O, parts | | | | | | | | | |
| Mixing temperature, °C | 21 | 21 | 21 | -5 | 0 | 10 | 35 | 45 | 45 |
| Carboxylic-carbonic acid anhydride of isophthalic acid and 2 moles of chloroformic acid ethyl ester (85% solution in toluene), parts | | 1 | 1 | 1 | 1 | 1 | 1 | 1 | |
| Carboxylic-carbonix acid anhydride of benzoic acid and 1 mole of chlochloroformic acid ethyl ester (85% solution in toluene), parts | 3 | 1 | | | | | | | 1 |
| Viscous after, seconds | 12 | 10 | 41 | 125 | 95 | 32 | 7 | 4 | 5 |
| No longer stirrable after, seconds | 15 | 18 | 55 | 190 | 150 | 40 | 10 | 6 | 7 |
| Solid after, seconds | 54 | 50 | 100 | 200 | 170 | 100 | 40 | 31 | 29 |

| | | | | | | | | | |
|---|---|---|---|---|---|---|---|---|---|
| 40% Na water glass, parts | 25 | 25 | 25 | 25 | 25 | 25 | 25 | 25 | 25 |
| 40% K water glass, parts | | | | | | | | | |
| 50% Na-C$_{10-18}$ alkyl sulfonate solution, parts | 0.5 | 0.5 | 0.5 | 0.5 | 0.5 | 1.25 | 1.25 | 1.25 | 1.25 |
| Petroleum ether, parts | | | | | | 0.1 | 0.25 | 0.5 | 1 |
| Butyl acetate, parts | | | | | | | | | |
| Chloroform, parts | | | | | | | | | |
| Paraffin oil, parts | | | | | | | | | |
| Solid Na$_2$SiO$_3$, parts | | | | | | | | | |
| H$_2$O, parts | | 6.25 | 12.5 | 12.5 | 25 | | | | |
| Mixing temperature, °C | 19 | 19 | 19 | 19 | 19 | 18 | 18 | 18 | 18 |
| Carboxylic-carbonic acid anhydride of isophthalic acid and 2 moles of chloroformic acid ethyl ester (85% solution in toluene), parts | 1 | 1 | 1 | 2 | 1 | 0.1 | 0.25 | 0.5 | 1 |
| Viscous after, seconds | 17 | 25 | 50 | 29 | 65 | >180 | 59 | 56 | 16 |
| No longer stirrable after, seconds | 26 | 38 | 70 | 40 | 80 | | 72 | 25 | 25 |
| Solid after, seconds | 70 | 79 | 100 | 85 | 110 | | 100 | 60 | 60 |

| | | | | | | | | | |
|---|---|---|---|---|---|---|---|---|---|
| 40% Na water glass, parts | 25 | 25 | 25 | 25 | 25 | 25 | 25 | 25 | 25 |
| 40% K water glass, parts | | | | | | | | | |
| 50% Na-C$_{10-18}$ alkyl sulfonate solution, parts | 1.25 | 1.25 | 1 | 1 | 1 | 1 | 1 | 1 | 0.5 |
| Petroleum ether, parts | 1.5 | 3 | | | | | | 1 | |
| Butyl acetate, parts | | | 0.5 | 1 | | | | 1 | |
| Chloroform, parts | | | | | 1 | 2 | | | |
| Paraffin oil, parts | | | | | | | 1 | | |
| Solid Na$_2$SiO$_3$, parts | | | | | | | | | |
| H$_2$O, parts | | | | | | | | | |
| Mixing temperature, °C | 18 | 18 | 18 | 18 | 18 | 18 | 18 | 18 | 20 |
| Carboxylic-carbonic acid anhydride of isophthalic acid and 2 moles of chloroformic acid ethyl ester (85% solution in toluene), parts | 1.5 | 3 | 0.5 | 1 | 1 | 2 | 1 | 1 | 1 |
| Viscous after, seconds | 15 | 12 | 55 | 14 | 15 | 15 | 16 | 16 | 17 |
| No longer stirrable after, seconds | 21 | 19 | 25 | 25 | 24 | 18 | 25 | 29 | 23 |
| Solid after, seconds | 58 | 55 | 59 | 60 | 58 | 55 | 60 | 63 | 70 |

| | | | | | |
|---|---|---|---|---|---|
| 40% Na water glass, parts | 25 | | 25 | 25 | 25 | 25 |
| 40% K water glass, parts | | | | | | |
| 50% Na-C$_{10-18}$ alkyl sulfonate solution, parts | 0.5 | | 0.5 | 1 | 1 | 1 |
| Petroleum ether, parts | | | | | | |
| Butyl acetate, parts | | | | | | |
| Chloroform, parts | | | | | | |
| Paraffin oil, parts | | | | | | |
| Solid Na$_2$SiO$_3$, parts | | | | 0.5 | 1 | 2 |
| H$_2$O, parts | | | | | | |
| Mixing temperature, °C | 20 | | 20 | 20 | 20 | 20 |
| Stirring | + | | ++ | | | |
| Carboxylic-carbonic acid anhydride of isophthalic acid and 2 moles of chloroformic acid ethyl ester (85% solution in toluene), parts | 1 | | 1 | 1.5 | 1.5 | 1.5 |
| Viscous after, seconds | 15 | | 9 | 14 | 17 | 17 |
| No longer stirrable after, seconds | 20 | | 15 | 20 | 22 | 13 |
| Solid after, seconds | 60 | | 55 | 50 | 55 | 51 |

EXAMPLE 3

25 parts of an approximately 40% Na-water glass solution and 2 parts of a 50% alkyl sulfonate solution are vigorously mixed with stirring in a vessel with a glass frit bottom through which air is blown. A stable foam is formed. Vigorous stirring is continued after formation of this foam while one part of diethyl pyrocarbonate dissolved in one part of light fraction petroleum hydrocarbons is added at about 23° C. (This experiment may also be carried out without the light fraction petroleum hydrocarbons.) The addition of air is stopped after 15 seconds, stirring is stopped after 20 seconds and the creamy foam is poured into a mold. The expanded foam becomes viscous after 30 seconds and solidifies after 35 seconds. The molded foam product is hard after 50 seconds and can be removed from the mold after about 70 seconds but it is preferable to leave it in the mold for a longer time because its mechanical strength can be improved by standing or by briefly heating it to about 70° C. The molded product has a density of about 0.5 when moist, and it can be dried by heating it in a drying cupboard or by micro wave treatment, after which its density decreases to about 0.25. It is, of course, non-combustible and can subsequently be worked in a moist or dry state or lacquered or coated.

EXAMPLE 4

25 parts of an approximately 40% Na-water glass solution are mixed with 0.5 part of a 50% Na-alkyl sulfonate solution with stirring. The resulting solution is forced into a mixing chamber equipped with a high-speed stirrer at the same time as 0.8 parts of difluorodichloromethane and 2 parts of diethyl pyrocarbonate. The mixing chamber is so constructed that the vigorously mixed reaction mixture can be discharged from the chamber through a discharge duct of variable length which ends in a nozzle, i.e. the process can be operated continuously. It is carried out at about 20° C. The rate of feed of the components is so calculated that the residence time in the apparatus is about 20 seconds after the components have been mixed. A reactive mixture is then discharged through the discharge duct. This mixture foams up when leaving the apparatus and can be conveyed into any molds while still in a fluid state or transferred to a conveyor belt on which it continues to foam and then starts to solidify after about 30 seconds. The composition can be transferred to a moving belt, for example, and then be arranged to pass through a drying, heating or high-frequency tunnel or covered with another belt to produce a sandwich foam. The resulting foam has a density of 0.4 to 0.7 gram per cc. when moist and 0.2 to 0.6 grams per cc. when dry. It may be used directly as panel goods or block goods or sandwich elements.

EXAMPLE 5

The procedure is the same as described in Example 4 except that in addition to the alkyl sulfonate, 3 parts of commercial sodium silicate (Henkel's Portil N) are dissolved in the water glass solution, whereby the viscosity of the silicate solution is increased, which is advantageous from a process technical point of view, with the result that a more stable foam is produced and stronger end products are obtained. Density when dry: 0.3–0.65 gram per cc.

EXAMPLE 6

This is the same as described in Example 5 except that the foaming mixture is removed after only 10 seconds and used for impregnating a loose glass fiber fleece (other fiber materials are also suitable) running under the die which in this case is a broad sheeting die. The resulting foam product is now glass fiber reinforced and can be used as building and insulating material.

EXAMPLE 7

25 parts of an approximately 35% sodium water glass solution and 10 parts of a latex (solids content approximately 40% by weight) which has been prepared with the aid of alkyl sulfonate as emulsifier are stirred together at 30° C. 2.5 parts of diethyl pyrocarbonate are then stirred in and the mixture is poured into the negative mold of a furniture decoration element. The mixture hardens 45 seconds after its introduction into the mold and can be removed after 70 seconds. The relief picture may either be lacquered when it is surface dry or it may first be dried in a circulating air cupboard. The following polymers are given as examples of the latices used:

A copolymer of styrene and 30% by weight of acrylonitrile,
B copolymer of ethylene and 75% by weight of vinyl acetate,
C copolymer of vinyl chloride and 10% by weight of ethylene,
D copolymer of vinyl chloride and 35% by weight of vinyl acetate,
E copolymer of butadiene and 33% by weight of styrene,
F copolymer of butadiene and 30% by weight of acrylonitrile,
G copolymer of styrene and 30% by weight of ethyl acrylate.

EXAMPLE 8

0.5 parts of $t$-butyl-peroctoate are stirred into 25 parts of a mixture of 50 parts of styrene and 50 parts of an unsaturated polyester which contains about 35 moles percent of maleic acid, 15 moles percent of phthalic acid, 35 moles percent of propylene glycol and 15 moles percent of butane diol, which polyester preferably contains OH end groups and has a molecular weight of about 3000. The resulting liquid mixture is then mixed with 0.85 parts of alkyl sulfonate (Bayer's Mersolat) in 30 parts of Na-water glass (solids content approximately 40% by weight) and stirred, an emulsion which has a continuous phase of water glass being formed. This emulsion is vigorously stirred and 1.5 parts of diethyl pyrocarbonate are added. At a reaction temperature of 25° C., the mixture becomes viscous after 35 seconds and solidifies in a casting mold after about 50 seconds. The solidified molded product still contains the reactive system of styrene and unsaturated polyester. This may now be hardened by heating to 70–90° C. or, if desired, higher temperatures may be employed so as to combine the drying process with the second hardening process.

One advantage of the method of procedure described above, which may also be carried out with solutions of polystyrene in styrene and analogous systems, is that considerable quantities of the inorganic reactive system can easily be worked up together with the organic filler because the filler is still liquid during the working up process.

EXAMPLE 9

5 parts of diethyl pyrocarbonate are added at 20° C. with stirring to 50 parts of an approximately 40% Na-water glass solution in which 2 parts of Na-alkyl sulfonate are dissolved. After about 20 seconds stirring, the thin liquid mixture is used to impregnate an open-celled panel of elastic polyurethane foam which is then squeezed off to remove excess reaction mixture. The mixture starts to solidify in the foam after about 35 seconds and is solid after 55 seconds. It is then dried in an air current at 80° C. The foam is then rigid and has approximately doubled its initial density. This impregnated foam may be used as an insulating material with improved resistance to ignition. Alternatively, the foam may be slowly heated to temperatures of about 500° C. with exclusion of air. Under these conditions, it undergoes substantial coking but the foam structure is preserved. The insulating material obtained in this way can no longer be ignited with a match.

EXAMPLE 10

3 parts of alkyl sulfonate (Mersolat) are dissolved in 300 parts of Na-water glass (solids content approximately 38% by weight). 15 parts of diethyl pyrocarbonate are then stirred in at 20° C. After 15 seconds vigorous stirring, the mixture, which is then still a thin liquid, is poured into a plate mold filled with glass fiber fleece until all the air has been displaced. The material starts to harden after 35 seconds and can be removed from the mould after 55 seconds. The plate is then left to stand for about 60 seconds and then passed through a drying oven which is at a temperature of about 160° C. During its passage through the drying oven, the plate dries and foams up. A hard, glass fiber reinforced panel with a cellular structure and a density of about 0.6 gram per cc. is obtained. It is completely non-combustible and can be used as an insulating material, a building element or a floor covering.

EXAMPLE 11

25 parts of a solution of 40 parts of sodium silicate in 60 parts of water are mixed with stirring with 0.25 parts of a 50% solution of a C-8 alkyl phenyl sulfonate in water. 0.15 parts of diethyl pyrocarbonate and 1 part of dipropyl pyrocarbonate (the diisopropyl ester is also suitable) are then added with stirring at about 25° C. The reaction mixture starts to become viscous after 30 seconds but does not immediately reach the stage of solidification. In fact, it remains easily workable for about 4 minutes, during which time it may be poured into molds or used for impregnating fleeces or mixed with fillers and other additives. The reaction mixture finally starts to solidify only after about 5 minutes. The molded products produced in this way are analogous in their properties to the articles produced in accordance with the other examples.

EXAMPLE 12

The parts indicated in this example are parts by volume.
200 parts per minute of an approximately 40% sodium water glass solution containing 1% of a 50% by weight aqueous alkyl sulfonate solution as emulsifier, which is heated to about 35° C. and 20 parts per minute of a solution of 1 part of diethyl pyrocarbonate in 1 part of fluorotrichloromethane are simultaneously forced under pressure into a mixing chamber analogous to that of Example 4.

The reaction mixture leaving the mixing head is introduced into a beaker-shaped mold of cardboard or polyurethane foam with a smooth surface. The mixture immediately starts to foam up in this mold, expanding to twice to three times its volume and forming a foam head which is sufficiently hardened after about 100 seconds to prevent further foaming.

The resulting foam has a fine cellular structure and a soft, i.e. easily indented consistency. It can be used as a flower holder.

EXAMPLE 13

A polyurethane sponge is impregnated with a solution of 1 part of diethyl pyrocarbonate in 1 part of petroleum ether and all the excess solution is then squeezed off. The sponge swells to about twice its volume. This pretreated sponge is then rolled in sodium water glass for about 30 seconds so that it becomes completely impregnated with the silicate solution and is then squeezed off. The sponge becomes rigid after 60 seconds while retaining its increased volume. It may be used moist as fire-resistant mat or in the dry state as an insulating material.

EXAMPLE 14

The procedure is the same as described in Example 12 but an additional mixing head is attached to the mixing apparatus to introduce a 50% latex of a copolymer of 75% by weight of butadiene and 25% by weight of styrene at the rate of 30 parts per minute. The resulting foam has the advantage that after it has been dried at 120° C. its abrasion gives rise to less dust. The dried material has a density of about 0.3 gram per cc. and may be used as an insulating material.

EXAMPLE 15

25 parts of an approximately 40% sodium water glass solution and 2 parts of a 50% alkyl sulfonate solution are vigorously mixed with stirring in a vessel which has a glass frit bottom through which air is blown. A stable foam is produced. This foam continues to be vigorously stirred while 1 part of a carboxylic-carbonic acid ester anhydride of isophthalic acid and 2 moles of ethyl chloroformate distributed in 1 part of light fraction petroleum hydrocarbons are added at about 23° C. (This experiment may also be carried out without the light petrol constituent.) The supply of air is stopped after 15 minutes and the stirring is stopped after 17 minutes and the resulting creamy foam is poured into a mold. The expanded foam becomes viscous after 20 minutes and solidifies after 55 minutes. The molded foam product is hard after 2 hours and can then be removed from the mold but it is preferable to leave it in the mold for a longer time because the strength of the product can be improved in this way or also by briefly heating it to about 70° C. The molded product has a density of about 0.5 gram per cc. when moist. It can be dried in a drying cupboard or by high-frequency treatment, its density then dropping to about 0.25 gram per cc. It is, of course, non-combustible and can be treated or lacquered or coated subsequently in the moist or dry state.

EXAMPLE 16

25 parts of an approximately 40% sodium water glass solution and 0.5 parts of a 50% sodium alkyl sulfonate solution are mixed together with stirring. The resulting solution and 1.5 parts of difluorodichloromethane, 0.3 parts of diethyl pyrocarbonate and 1 part of a carboxylic-carbonic acid ester anhydride of benzoic acid and 1 mole of ethyl chloroformate are simultaneously forced into a mixing chamber which is equipped with a high-speed stirrer and so constructed that the vigorously mixed reaction mixture can be discharged from the chamber through a discharge duct of variable length which ends in a nozzle, i.e. the process may be carried out continuously.

The addition of the small quantity of diethyl pyrocarbonate causes rapid onset of thickening of the reaction mixture while the carboxylic-carbonic acid ester anhydride of benzoic acid and ethyl chloroformate brings about the final slow solidification of the product. The process is carried out at about 20° C. The rate of feed of the components is so adjusted that the residence time in the apparatus after mixing is about 20 seconds. A reactive mixture is then discharged through the discharge duct. This mixture foams up on leaving the apparatus and may be introduced into molds while still in a fluid state or placed on a moving conveyor belt where it continues to foam and then starts to solidify after about 30 seconds. The composition, when applied to a belt, may be passed through a drying, heating or high-frequency tunnel or covered with another belt to produce a sandwich foam. The resulting foam has a density of 0.4–0.7 gram per cc. when moist and 0.2 to 0.6 gram per cc. when dry. It may be used as unfinished, still workable material or it may be used directly as panels or blocks or sandwich elements but it may also be washed free from water, e.g. with acetone, a and/or impregnated with a resin solution and dried.

EXAMPLE 17

The process of Example 16 is repeated that the foaming mixture is removed from the apparatus after only 10 seconds and used for impregnating a loose glass fiber fleece (other fiber materials are also suitable) passing below the nozzle which in this case is a broad sheeting dye. The resulting foam product is now glass fiber reinforced and may be used as building and insulating material.

EXAMPLE 18

25 parts of sodium water glass solution in which 0.75 parts of sodium alkyl sulfonate (Mersolat) are dissolved are vigorously mixed with 1.1 parts of carboxylic-carbonic acid ester anhydride of isophthalic acid and 2 moles of ethyl chloroformate in a mixing chamber similar in construction to that described in Example 16. The reaction mixture is removed from the apparatus after a residence time of 80 seconds at 20° C.

This reaction mixture may be introduced into a rotary cylindrical hollow mold where it solidifies after about 8 minutes at 40° C. The hollow mould is advantageously first sprayed with a mold parting agent based on wax or silicone. The molded product obtained by rotary casting can be removed from the hollow mould after about 20 minutes. A molded product of greater stability is obtained if the hollow mold used is lined with a fleece or woven fabric of metal, glass fibers or inorganic fibers. In that case, the reaction mixture, which is still highly fluid, impregnates the fiber material so that the hollow structure obtained is reinforced to any required degree. This product may be used in the moist or dry state. Alternatively, the reaction mixture may be used for filling a relief mold made of a synthetic resin, wood, plaster of Paris or metal, etc. This mold may be equipped with heating means if desired and may have any dimensions since the amount of heat evolved in the reaction is so slight that it does not interfere with the process.

The reaction mixture leaving the apparatus, which only starts to solidify after about 10 minutes at the operating temperature employed of about 20° C., may also be introduced into a mold filled with particles of pumice or expanded clay or polystyrene foam beads so that the cavities are filled with reaction mixture and the particles, e.g. of expanded clay, become firmly bonded. Building elements may advantageously be produced in this way.

According to another procedure, the reaction mixture leaving the apparatus is vigorously mixed with foam particles e.g. of polystyrene, PVC, polysulfones or polyethylene, optionally in combination with fibers, and poured into molds. This method may be used, for example, for producing insulating panels whcih may be used in a moist or dry, tempered or annealed state.

The reaction mixture leaving the apparatus may also be applied to fibers which are then immediately wound on a winding apparatus to form a hollow body. Hollow bodies with improved strength can be obtained in this way. The advantage of using glass fibers is firstly that a particularly firm bond can be achieved between the reaction mixture and glass fibers and secondly the product obtained may be classified as non-combustible. Asbestos fibers are also very suitable.

The same applies to the production of panel goods by impregnating glass fiber fleeces with the reaction mixture and then leaving them to harden, optionally under pressure to squeeze off excess impregnating fluid.

The reaction mixture leaving the mixing apparatus may also be sprayed on walls, using a spray apparatus which atomizes the liquid mixture at a high pressure. The material hardens on the wall within a few minutes. The wall may also be an inflatable rubber balloon so that this method may be used, for example, for producing hollow bodies or igloos on a rotating half shell. In that case, the most suitable spray device is a commercially available device which has been developed for polyester spraying processess and which sprays the fibrous material at the same time as the reaction mixture.

EXAMPLE 19

The procedure is the same as described in Example 6 but is carried out at 25° C. and with the addition of 0.5 parts of diethyl pyrocarbonate. The residence time in the mixing apparatus is adjusted to about 30 seconds by means of the dosing devices. A plastic strand is then discharged from the nozzle of the discharge pipe. This strand becomes continuously more rigid and is solid after about 60 seconds. It has a square cross-section corresponding to the section of the nozzle, with the sides of the square 5 mm. in length. It is granulated after about 20 minutes. If this granulate is passed through a heating cupboard at a temperature of 180° C., foam particles with a density of 0.5 gram per cc. are obtained. These may be used as fireproofing insulating material. The granulate particles may also be heated in a high-frequency field; they are not exploited by this treatment and attain similar densities.

EXAMPLE 20

25 parts of sodium water glass water are mixed with 15 parts of finely powdered filler with the addition of 3 parts of phthalocyanine blue pigment to produce an easily stirred mixture. 1.5 parts of a solution of 10% by weight of a product of addition of about 10 moles of ethylene oxide to isooctyl phenol in a carboxylic-carbonic acid ester anhydride of isophthalic acid and 2 moles of ethyl chloroformate are added to this mixture with constant stirring at 25° C. The mixture remains stirrable for about 10 minutes and must be introduced into the required mold within 15 minutes. It solidifies in the mold after about 55 minutes and can be removed after about 75 minutes. The molded articles obtained may be used as decoration elements either in the moist or dry state.

The following are examples of fillers which may be used in this general method of procedure: talcum, dolomite, chalk, glass, sand, asbestos, titanium dioxide, heavy spar, polyethylene, polypropylene, polystyrene, polyvinyl chloride, polyacrylonitrile, polymethyl methacrylate and formaldehyde resins based on phenol, melamine or urea.

EXAMPLE 21

25 parts of an approximately 40% sodium water glass are vigorously mixed with stirring with 25 parts of water and 25 parts of finely powdered $CaCO_3$ at 25° C. 1 part of the carboxylic-carbonic acid ester anhydride of isophthalic acid and 2 moles of ethyl chloroformate are then added and the stirred mixture is passed through a mixing turbine. After 9 minutes, the reaction mixture, which is becoming viscous, is introduced into a box mold from which it can be removed after 2 hours. While fresh and moist, the material has a relatively low strength, i.e. it can be crumbled by pressing it between the fingers. This molded article, which has approximately the shape of a flat brick, is then introduced into a heating oven in which it is heated to 160° C. for 60 minutes. By the end of this time, the brick has considerably increased in strength without any significant shrinkage and it can no longer be deformed or destroyed by hand.

EXAMPLE 22

25 parts of an approximately 40% sodium water glass solution, 0.1 part of sodium alkyl sulfonate and 1 part of the carboxylic-carbonic acid ester anhydride of isophthalic acid and 2 moles of ethyl chloroformate are vigorously mixed with stirring. The resulting mixture is used to impregnate a glass fiber or nylon-6 fleece so that a firm panel with a thickness of about 0.5 cm. is obtained after hardening. This panel can be further shaped in a press heated to about 100° C., e.g. to form a shell. This shell may be used in the moist or dry state.

EXAMPLE 23

25 parts of a 43% sodium silicate solution in which 1% by weight of sodium alkyl sulfonate (Mersolat) is dissolved are vigorously mixed with stirring with a mixture of 2 parts of monofluorotrichloromethane and 2 parts of the carboxylic-carbonic acid ester anhydride of isophthalic acid and 2 mols of ethyl chloroformate in a sealed vessel at about 18° C. for 180 seconds. The mixture, which is slowly becoming more viscous, is then poured as a thin film thickness about 3 mm.) on to a polyethylene support which is kept at a temperature of about 30° C. The material foams up to form a foam panel about 2 cm. in thickness which is hardened in about 50 minutes. It can be further strengthened by a drying process in a circulating air cupboard followed by tempering at 180° C. to yield a heat-resistant insulating material with a unit weight of about 0.05 g./cm.$^2$.

The reaction mixture may also be introduced into a closed mold so that it is only partly filled. This mould may advantageously be heated so that the reaction mixture fills the mold when it foams up. The hardened molded products obtained have a stable, substantially closed outer skin and a cellular core. Their unit weight depends on the extent to which the mould was filled and may vary from 0.1 to 1.

EXAMPLE 24

1000 parts of a 39% sodium water glass solution, 10 parts of sodium alkyl sulfonate (Mersolat), 50 parts of petroleum ether, 300 parts of short chrysotile asbestos fibers and 35 parts of the carboxylic acid ester anhydride of 1 mole of isophthalic acid and 2 moles of ethyl chloroformate are kneaded in a kneading apparatus at 21° C. After 10 minutes, the resulting dough is extruded through a screw with a broad sheeting dye on to a band to form a strand of rectangular cross-section with a thickness of about 1 cm. and a width of 30 cm. This strand is passed through a tunnel furnace heated to 160° C. with hot air (alternatively, high-frequency heating is very suitable) on a double band of wire mesh. The strand foams in this furnace to form a panel with a density of 0.2 g./cm.$^3$ and dries at the same time. The double band ensures that the surfaces will be flat. This panel can be sawn, nailed and used as a fire-resistant insulating material.

It will be appreciated that the instant specification and examples are set forth by way of illustration and not limitation, and that various modifications and changes may be made without departing from the spirit and scope of the present invention.

What is claimed is:

1. In the hardening of an aqueous silicate solution wherein an acidic material is added to the solution and the solution is mixed to distribute the acid therethrough, the improvement which comprises employing as said acidic material at least one member selected from the group consisting of a pyrocarbonic acid ester and a carboxylic-carbonic acid ester anhydride.

2. The process of claim 1, wherein the acidic material is the pyrocarbonic acid ester of an alcohol of 1 to 18 carbon atoms.

3. The process of claim 2, wherein the alcohol is an alkanol of 1 to 4 carbon atoms.

4. The process of claim 3, wherein the alkanol is ethanol.

5. The process of claim 1, wherein the acidic material is a carboxylic-carbonic acid ester anhydride of the formula

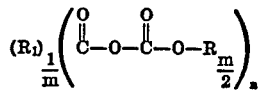

wherein $R_1$ = a mononuclear or polynuclear substituted or unsubstituted aromatic radical, araliphatic radical or saturated or unsaturated aliphatic radical with the number of carbon atoms ranging from 1 to about 5000, $R_{m/2}$ = a substituted or unsubstituted aromatic or araliphatic or aliphatic radical derived from an $m$-valent alcohol, and $n$ is an integer from 1 to 100.

6. The process of claim 5, wherein $R_1$ is a six-membered aromatic ring, $R_2$ is the radical of an alcohol of 1 to 8 carbon atoms, and $n$ is 1 to 3.

7. The process of claim 6, wherein the acidic material is benzoic acid-carbonic acid ethyl ester anhydride.

8. The process of claim 6, wherein the acidic material is (isophthalic acid-carbonic acid ethyl ester) dianhydride.

9. The process of claim 1, wherein the aqueous silicate solution has a concentration of about 10 to 50% by weight of an alkali metal silicate, the acidic material being employed in about 0.01 to 30% by weight of the silicate.

10. The process of claim 1, wherein the mixed solution is continuously extruded so as to form a continuous structure.

11. The process of claim 1, wherein there is mixed into acid solution a foam stabilizer and at least one of a gas and a liquid boiling below about 180° C.

12. The process of claim 1, wherein there is mixed into said solution a blowing agent.

13. The process of claim 12, wherein the blowing agent is a hydrocarbon of up to 10 carbon atoms.

14. The process of claim 12, wherein the blowing agent is trichlorfluor methane.

References Cited
UNITED STATES PATENTS 3,306,756  2/1967  Miller _____ 106—74
3,493,406  2/1970  Fillet et al. _____ 106—74

JAMES E. POER, Primary Examiner

U.S. Cl. X.R.

106—74, 84